Nov. 14, 1967
P. S. HARDY
3,352,019
LAYOUT FIXTURE
Filed July 22, 1964
4 Sheets-Sheet 1
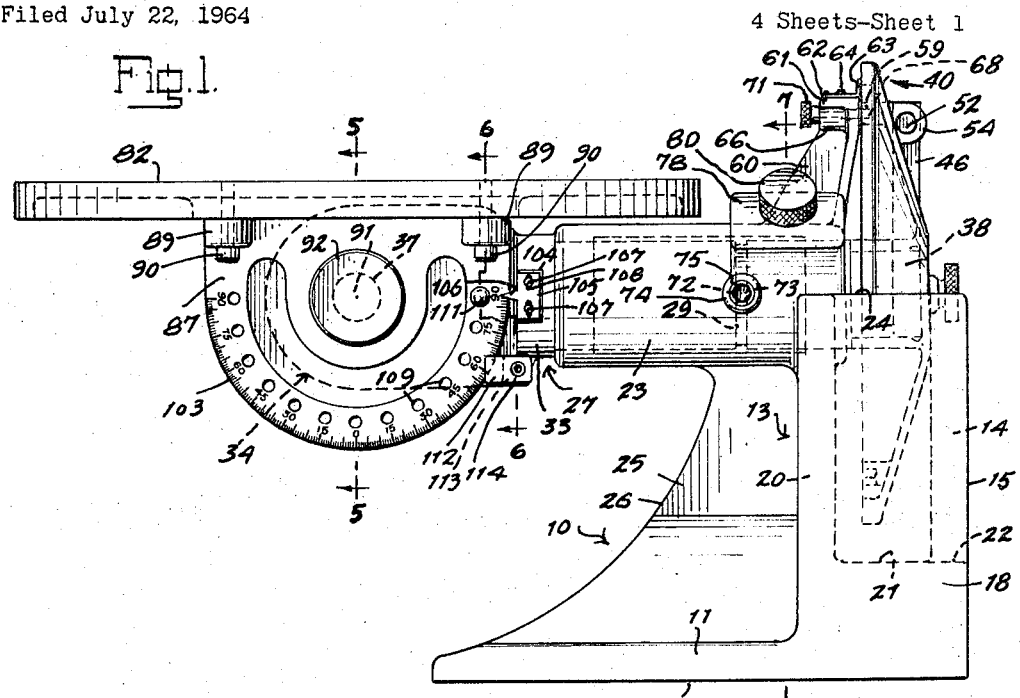
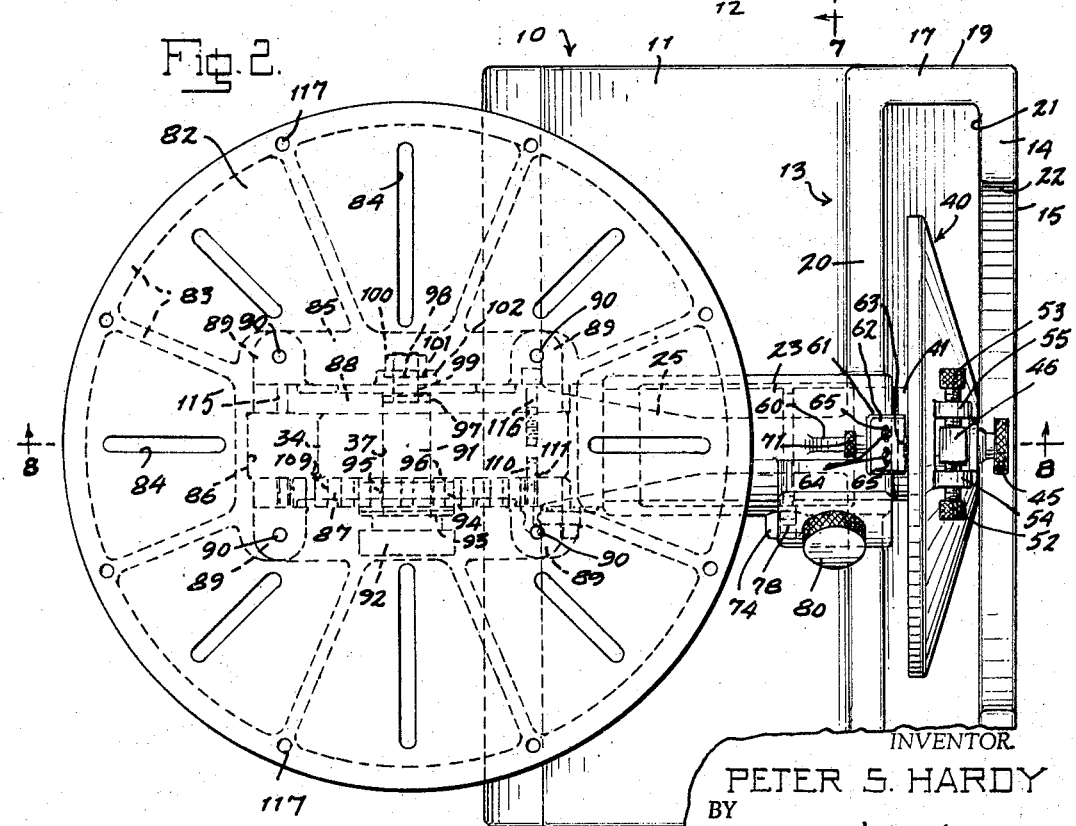
INVENTOR.
PETER S. HARDY
BY
ATTORNEY Nov. 14, 1967  P. S. HARDY  3,352,019
LAYOUT FIXTURE
Filed July 22, 1964  4 Sheets-Sheet 2
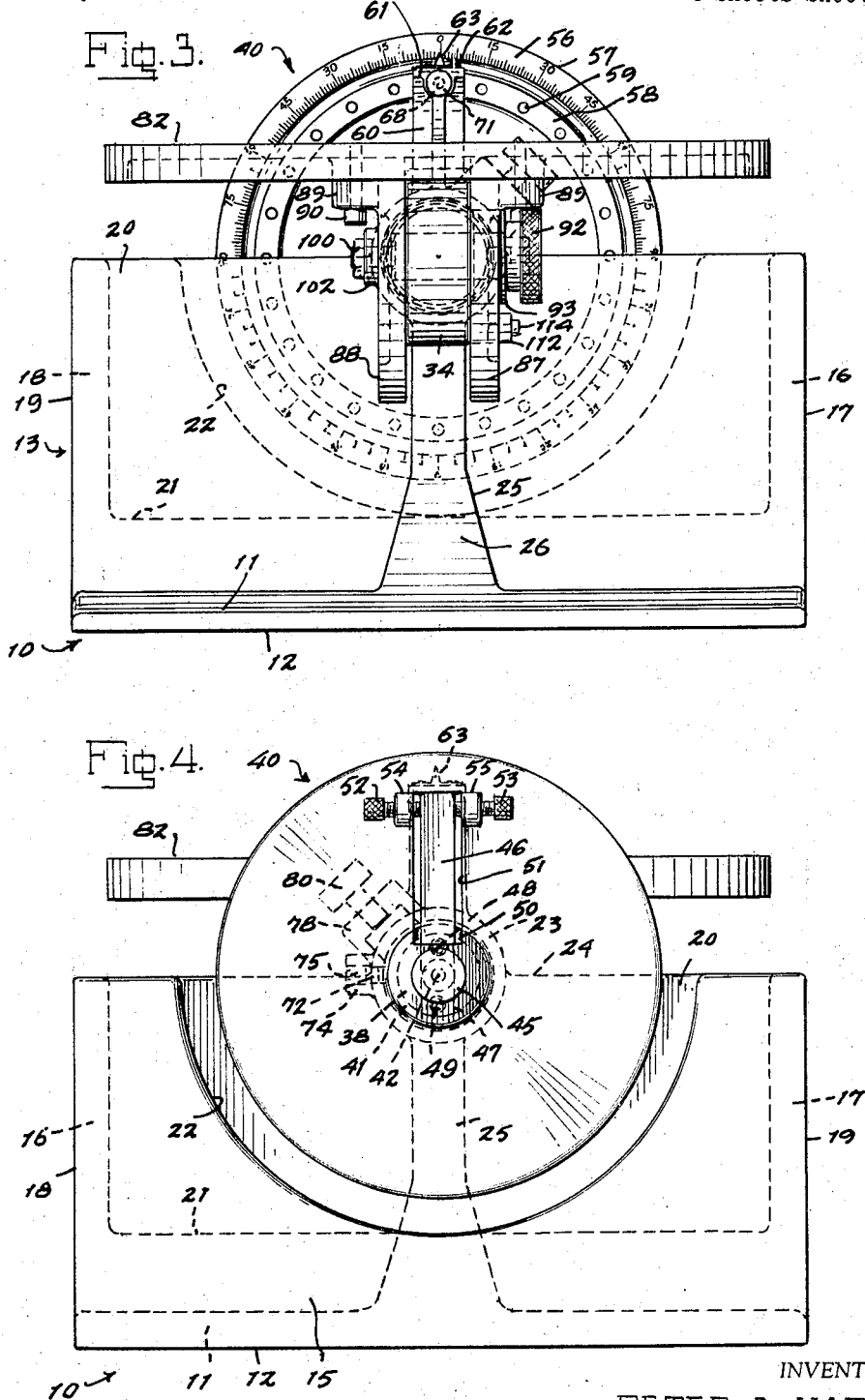
INVENTOR.
PETER S. HARDY
BY
ATTORNEY.

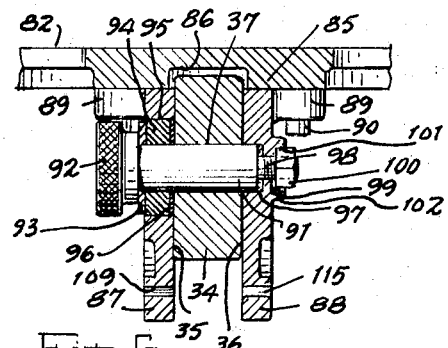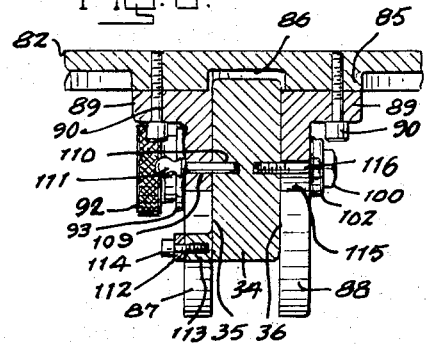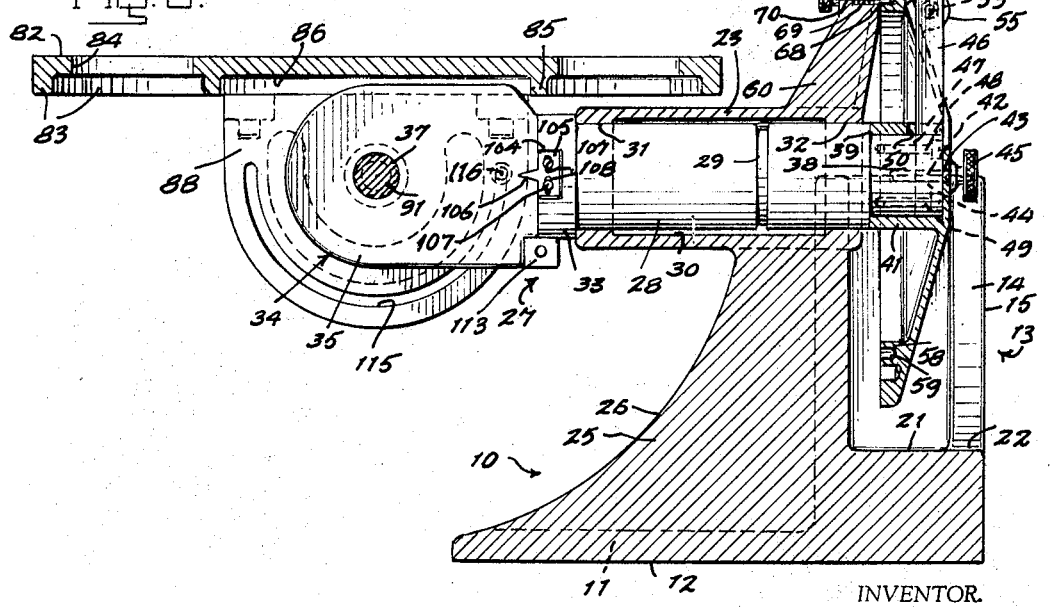

United States Patent Office 3,352,019
Patented Nov. 14, 1967

3,352,019
LAYOUT FIXTURE
Peter S. Hardy, Trumbull, Conn., assignor to Peerless Aluminum Foundry Co., Inc., Bridgeport, Conn., a corporation of Connecticut
Filed July 22, 1964, Ser. No. 384,364
13 Claims. (Cl. 33—174)

ABSTRACT OF THE DISCLOSURE

A layout fixture having a base provided with first and second support-engaging surfaces at right angles to each other, third and fourth support-engaging surfaces opposed to each other and at right angles to the first and second support-engaging surfaces, a work-supporting table carried by the base for orientation to any position of angular adjustment with reference to two intersecting axes at right angles to each other, and a detachable work-holder in which the work piece is clamped for mounting upon the work-supporting table in either an obverse or reverse position while maintaining an exact relationship to an established reference point.

---

The present invention relates to a layout fixture particularly of the type for laying out, checking, measuring and computing work pieces such as patterns, castings, models, machined parts, and the like, having intricate surfaces of varying form disposed in precise angular relationship, an object of the invention being to provide a layout fixture of this character capable of universal positioning of the workpiece with respect to two intersecting reference axes disposed at right angles to each other.

A further object is to provide a layout fixture having index calibration scales in relation to the two axes and adjustment means for precisely coordinating zero markings on the two scales with each other and with a work supporting table. Another object is to provide a layout fixture having conveniently accessible, easily operable means for adjusting the work supporting table to desired positions and positively fixing the adjusted position of the table.

A further object is to provide a layout fixture having a supporting base adapted for support upon a horizontal surface and including a plurality of base surfaces for engagement with the horizontal surface disposed in different planes, whereby the fixture may be supported in any one of several positions for most convenient access to the workpiece. It is particularly proposed to provide a supporting base having a first planar supporting surface, a second planar supporting surface disposed in a plane at right angles to the first supporting surface, a third planar supporting surface disposed in a plane at right angles to the planes of the first and second supporting surfaces, and a fourth planar supporting surface in spaced parallel relation to the third supporting surface and disposed in a plane at right angles to the first and second supporting surfaces.

A further object is to provide a work holder for cooperative support upon the layout fixture adapted to rigidly hold an intricate workpiece in a fixed obverse position, and which permits the holder and the workpiece to be removed and replaced in an inverted or reversed position to thus maintain the workpiece in either its obverse position in precise relationship to an established reference point.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:
FIG. 1 is a side elevation of a layout fixture according to the invention;
FIG. 2 is a top plan view;
FIG. 3 is a front elevation;
FIG. 4 is a rear elevation;
FIG. 5 is a transverse vertical sectional view taken along the line 5—5 of FIG. 1;
FIG. 6 is a transverse vertical sectional view taken along the line 6—6 of FIG. 1;
FIG. 7 is a transverse vertical sectional view taken along the line 7—7 of FIG. 1;
FIG. 8 is a longitudinal vertical sectional view taken along the line 8—8 of FIG. 2;
FIG. 9 is a side elevation partially broken away showing the work holder according to the invention supported in its obverse position upon the table of the layout fixture, the broken lines showing a work piece in obverse position within the holder;
FIG. 10 is a top plan view thereof, the workpiece and certain of the adjustable holding clamps in engagement therewith being shown in broken lines, and one of the holding clamps being shown in full lines;
FIG. 11 is a side elevation partially broken away showing the work holder in reverse position upon the table;
FIG. 12 is a plan view on an enlarged scale of one of the adjustable holding clamps;
FIG. 13 is a bottom plan view thereof; and
FIG. 14 is a longitudinal vertical sectional view taken along the line 14—14 of FIG. 12 and showing the bolts for cooperation therewith in separated relation.

Referring to the drawings the layout fixture, according to the exemplary embodiment of the invention illustrated therein, comprises a base 10 preferably of cast metal and of sufficient weight and mass to provide a stable stationary support for the adjustable work supporting table of the fixture when supported upon a horizontal surface in one of four positions in which the base may be placed to dispose the work in the most desirable aspect. To this end the base comprises a rectangular bottom wall 11 horizontally disposed in the normal position as illustrated in the drawings and providing a lower rectangular first supporting planar surface 12, an upwardly extending well-like portion 13 of generally rectangular form comprising a vertically disposed rear wall 14 providing a second supporting planar surface 15 extending upwardly at right angles from the rearward edge of the first supporting surface 12, end walls 16 and 17 providing third and fourth supporting surfaces 18 and 19 extending upwardly at right angles from the side edges of the first supporting surface 12 and disposed at right angles to the second supporting surface 15, and a forward vertical wall 20 rearwardly spaced from the forward edge of the bottom wall 11. The portion 13 is provided with a generally rectangular cavity 21 opening to its upper side and the rear wall 14 is provided with a semi-circular cut-out 22 opening to the cavity 21.

A cylindrical bearing hub 23 extends forwardly from the forward wall 20 of the portion 13 in upwardly spaced parallel relation to the bottom wall 11, with the rearward end of the passage therethrough opening to the cavity 21 and with its longitudinal axis coinciding with the horizontal plane of the upper end surface 24 of the portion 13. A reinforcing web 25 extends between the bottom wall 11, the forward wall 20 of the portion 13, and the under side of the hub 23, and has its forward edge 26 curved in concentric relation to the intersection of the two axes about which the work supporting table is adapted to be adjusted, as will hereinafter more fully appear, the radius of the curved edge 26 being such as to provide clearance for the work supporting table as the latter is moved during adjustment.

Within the hub 23 there is engaged for rotatable adjustment a shaft 27 which, as clearly shown in FIG. 8, comprises an intermediate cylindrical spindle portion 28 journaled in the bearing hub and provided intermediate its ends with an annular positioning groove 29 for cooperation with positioning means presently to be more fully described to restrain longitudinal movement in the hub, the inner surface of the hub being relieved as at 30 to provide annular bearing surfaces 31 and 32 at the respective ends of the hub for bearing contact with the spindle portion 28. Forwardly of the spindle portion 28 the shaft is provided with an enlarged diameter collar portion 33 bearing upon the forward end of the hub, and forwardly of the collar portion is provided with an enlarged head portion 34 having flat parallel side faces 35 and 36 disposed at equal distances at each side of the longitudinal axis of the shaft and provided with a transverse bearing hole 37 having its axis normal to and intersecting the longitudinal axis of the shaft, the forward end of the head portion being concentric to the bearing hole. The rearward end of the spindle portion 28 projects slightly beyond the rearward end of the hub and a reduced diameter stub shaft portion 38 extends rearwardly therefrom into the cavity 21 of the base portion 13, an annular shoulder 39 being provided at the rearward end of the spindle portion 28 at its junction with the stub shaft portion 38.

A circular index dial 40, preferably in the form of a dished frustrum of a cone having its open side facing forwardly, has its central cylindrical hub portion 41 mounted for rotatable adjustment upon the stub shaft portion 38 of the shaft 27, with the lower half of the dial disposed within the cavity 21 and with its periphery in concentric inwardly spaced relation to the cut-out opening 22 of the base. The dial is secured upon the stub shaft portion 38 in its position of adjustment by a thumb screw 42 engaged through a center hole 43 in the dial and screwed into a central threaded hole 44 in the stub shaft portion, the shouldered knurled head 45 of the screw bearing upon the outer surface of the dial and being disposed for convenient access within the cut-out opening 22 in inwardly spaced relation to the vertical planar surface 15 of the base.

An upright bar 46, preferably of rectangular cross-section, is secured within a diametrically disposed rectangular recess 47 in the rearward end of the stub shaft portion 38 by a pair of cap screws 48 and 49 and projects upwardly at right angles to the axis of the shaft 27 through a notch 50 in the hub 41 and through a clearance slot 51 in the conical wall of the dial, with its upper end projecting outwardly from the dial where it is engaged at opposite sides by adjustable set screws 52 and 53 respectively threaded in lugs 54 and 55 provided upon the dial at each side of the upper end of the slot 51. These set screws together with the center thumb screw 42 serve to rigidly connect the dial to the shaft 27 and, upon loosening of the center screw 42, permit micrometer adjustment of the shaft 27 relatively to the dial by causing the shaft to be rotated in one direction or the other as one or the other set screws 52 and 53 is turned inwardly or backed off to swing the bar 46 relatively to the dial.

The dial is provided at its forwardly facing side with an outer annular rim portion 56 provided with a calibrated scale 57 extending about its full circumference and suitably marked to indicate 360°, and inwardly of the annular rim portion 56 there is provided an annular rib portion 58 provided in equally spaced relation with a series of cylindrical pockets 59 representing major divisions of the index scale, for example being spaced 15° apart.

An upwardly extending arm 60 integrally formed upon the rearward end portion of the hub 23 of the base is provided at its upper end with a horizontal platform portion 61 upon which an index plate 62 having an upwardly projecting index point 63 disposed over the scale 57 is secured for lateral adjustment by a pair of screws 64—64 engaged through slots 65—65 in the plate and screwed into the platform portion 61. Beneath the platform portion there is provided a barrel portion 66 having a shouldered horizontal passage 67 in which there is engaged a retractable plunger 68 adapted to engage a selected one of the pockets 59 through the pressure of a helical spring 69 disposed within the passage, being provided with a stem 70 having a knurled head 71 at its outer end for manually withdrawing the plunger from the socket. The dial may thus be conveniently held at the major 15° adjustment positions of the dial.

The shaft 27 is secured against longitudinal movement within the hub 23 by a key 72 engaged with the annular groove 29 and disposed in the radial passage 73 of a cylindrical boss 74 provided upon the hub, the outer end of the passage being threaded and engaged by a set screw 75 which normaly retains the key in engagement with the groove.

The shaft 27 is adapted to be secured in any position of rotary adjustment to which it is moved through rotation of the dial by means of a pressure shoe 76 disposed in a pocket 77 of an enlargement 78 provided upon the hub 23, the curved face 79 of the shoe being pressed into engagement with the cylindrical surface of the shaft by a thumb screw 80 engaged in a threaded hole 81 in the outer wall of the enlargement 78.

The work supporting table 82 is preferably circular and provided at its under side with a reinforcing rim and radial ribs 83 and having, preferably in the areas between the reinforcing ribs, suitably arranged radial slots 84 for receiving work piece retaining bolts and clamps in conventional manner. The reinforcing structure includes a centrally disposed substantially rectangular platform portion 85 having a diametrically extending recess 86 in its under side to provide clearance for the head portion 34 of the shaft 27, as will presently more fully appear.

Upon the platform portion 85 at the respective sides of the recess 86 there are mounted a pair of trunnion members 87 and 88 having pairs of outwardly extending apertured lugs 89 at the ends of their upper edges engaged by bolts 90 screwed into the platform portion 85 of the table to rigidly secure the trunnion members thereto. The trunnion members are disposed at the respective sides of the head portion 34 of the shaft 27 in engagement with its parallel side faces 35 and 36, and are supported upon a transverse shaft 91 journaled in the bearing hole 37 of the head portion 34 for rotation about an axis normal to and intersecting the axis of the shaft 27. At one end the shaft 91 is provided with a hand wheel or knob 92 which bears upon a washer 93 engaged with a pressure ring 94 disposed in a cylindrical opening 95 of the trunnion member 87, and which in turn engages a friction ring 96 of leather or other suitable material disposed in contact with the face 36 of the head 34. At its other end the shaft 91 is engaged in a pocket 97 in the inner face of the trunnion member 88 and is provided with a threaded stud 98 extended through a reduced hole 99 and screwed into a hexagonal nut 100 non-rotatably fitted in a hexagonal pocket 101 provided in a boss formation 102 upon the outer face of the trunnion member 88. Thus, rotation of the shaft 91 by means of the hand wheel 92 in one direction with respect to the fixed nut 100 causes the pressure ring 94 and the friction ring 96 to be pressed tightly against the face 35 of the head portion 34 over a substantially large area to effectually secure the position of adjustment of the table. Upon the rotation of the shaft 91 in the opposite direction the table is released to permit its free adjustment movement.

The lower sides of the trunnion members are of semicircular form concentric to the shaft 91, and the marginal outer side of the trunnion member 87 is provided along its semi-circular lower edge with a calibrated scale 103 representing 180°. Upon a flattened surface 104 at the side of the collar portion 33 of the shaft 27 there is provided an index plate 105 having an index point 106 disposed over the scale 103, the index plate being secured for vertical adjustment by means of a pair of screws 107 engaged through slots 108 in the plate and screwed into the collar portion.

Inwardly of the scale 103 the trunnion member 87 is provided with a semi-circular series of spaced holes 109 in radial line with major markings of the scale, for example the 15° spaced markings, and, in register with the hole 109 disposed in line with the index point 106, a pocket 110 is provided in the head portion 34 to receive a locking pin 111 to thus secure the table at any 15° adjusted position. In intermediate positions of adjustment the pin is removed and the table is secured by a clamp plate 112 engaged over the margin of the trunnion member 87 and mounted upon a boss formation 113 provided upon the head portion 34 by means of a cap screw 114. It is pointed out that the securing means represented by the pin 111 and the clamp plate 112 is intended for convenient use in positioning and initially retaining the table in its desired position of adjustment whereupon the table is firmly locked by tightening of the pressure ring 94.

Additional means for locking the position of the table consists in a semi-circular slot 115 in the trunnion member 88 in concentric relation to the shaft 91 engaged by a headed pressure screw 116 screwed into the head portion 34 in axial alignment with the pocket 110, the head of the screw in its tightened position bearing upon the outer face of the trunnion member 88 to secure it.

As shown in FIGS. 1–4 the base 10 is in its normal position wherein the first supporting surface 12 is engaged with a horizontal support and the table is in a horizontal position. From this position the table may be angularly adjusted through 180° by rotation of the trunnion members 85 and 86 about the head 34 of the shaft 27. At the same time the shaft 27 may be angularly adjusted through 360° by rotation of the dial 40, and thus the work piece supported upon the table may be brought to any desired position with respect to the supporting surface 12 as reference. When it is desired to place the work in a different aspect for more convenient access thereto, the base may be turned to engage either one of the second, third or fourth supporting surfaces 15, 18 or 19 with the horizontal support, and in each case the well-like portion 13 of the base effectually protects the dial 40 against contact with the support and permits it to be turned to adjust the shaft 27. The adjustments afforded by the adjustable index plates 62 and 105 and the bar 46 connecting the shaft 27 to the dial enable the zero markings of the two scales 57 and 103 to be accurately coordinated with an exact reference position of the table relatively to the base.

The table 82 is provided adjacent its periphery with a circumferential series of equally spaced vertical holes 117 preferably in radial line with the radial reinforcing ribs 83, eight of such holes being provided in the disclosed example. These holes serve to mount upon the table the reversible work-holding means shown in FIGS. 9–14.

The work-holding means comprises an octagonal frame member 118 provided at its four alternate corners with vertical sleeves 119, the axes of which are adapted to register with the axes of four alternate holes 117 of the table, each said sleeve being provided with a vertically adjustable post 120 adapted to be secured in its position of vertical adjustment by a set screw 121 engaged in a boss 122 of the sleeve. Each post is provided at its respective ends with reduced diameter pins 123 and 124 substantially corresponding in length to the thickness of the table and adapted to engage within the holes 117 with a snug slip fit, each pin being provided with a threaded socket 125 to receive the threaded shank of a cap screw 126 to retain the post upon the table through engagement of the head of the screw with the under side of the table.

Centrally along the upper side of the frame member in parallel relation therewith there is provided a rib 127, and at suitable spaced points threaded holes 128 extend through the rib and the frame for the purpose of securing thereto adjustable clamp brackets 129, presently to be more fully described.

The number and position of the clamp brackets depends upon the particular shape of the work piece to be held and, as shown in detail in FIGS. 12–14, each bracket comprises a bar 130 provided at one end with a non-threaded hole 131 and at its other end with a threaded hole 132. At its under side in concentric surrounding relation to the hole 131 there are provided eight triangular lugs 133, so spaced and arranged as to provide a plurality of grooves 134 for selective interlocking engagement with the rib 127 of the frame, the grooves being along diametric lines at 45° to each other whereby the bar may be interlocked with the rib 127 in any one of eight positions of angular adjustment. The bar is secured in its selected position by a cap screw 135 engaged through the hole 131 and screwed into the selected threaded hole 128 of the frame. A block member 136 is adjustably mounted at the swinging end of the bar 130, being provided for this purpose with a vertical non-threaded hole 137 engaged by a cap screw 138 screwed into the threaded hole 132 of the bar, whereby upon tightening of the bolt the block member is secured in any position of angular adjustment about the axis of the cap screw. In spaced relation to the vertical hole 137 the block member is provided with a horizontal threaded hole 139 engaged by an elongated work-engaging screw 140.

As shown in FIGS. 9 and 10 the work piece 141, indicated by broken lines, is supported upon the table 82 and is rigidly suspended within the frame through engagement of the plurality of clamp brackets 129 with opposed surfaces thereof, the clamp brackets being placed at the most suitable positions about the frame to support the particular shape of the work piece and being angularly adjusted to enable the work-engaging screws 140 to be disposed in positions normal to the surfaces engaged thereby. The position of vertical adjustment of the frame member upon the posts is the one best suited to the particular work piece. When it is desired to remove the work piece from the table for operations thereon at some other location, the frame, either together with or removed from the posts, may be transported from the table without disturbing the suspended relation of the work piece and may thereafter be replaced upon the table in exactly the same position. The frame also permits the work piece to be removed from the table and replaced thereon in an inverted position as seen in FIG. 11 without disturbing the rigidly suspended position of the work piece within the frame. In such inverted position the work piece may be brought to rest upon the table by vertically adjusting the frame upon the posts, as clearly shown in FIG. 11. Also, the work piece, in either the observe or the reverse position, may be placed in eight different angular positions of adjustment about the center axis of the table, either by advancing the position of the frame upon the posts or by advancing the position of the posts in the holes 117 of the table.

What is claimed is:

1. A layout fixture comprising a base having a support-engaging surface, a hub carried by said base having its axis in spaced parallel relation to said support-engaging surface, a shaft member supported by said base including a spindle portion rotatably engaged in said hub, a head portion projecting forwardly from said hub having a pair of parallel side surfaces equally spaced at each side of the axis of said shaft member and having a transverse bearing hole having its axis normal to and intersecting the axis of said shaft member, and a stub shaft portion at the opposite end of said shaft member from said head portion and projecting from said hub, an index dial carried upon said stub shaft portion and including a circumferential calibrated index scale, an index pointer carried by said base and overlying said scale, a work-supporting table, a pair of trunnion members carried by said work-supporting table and respectively disposed at opposite sides of said head portion, a transverse shaft carried by said trunnion members and engaged in said bearing hole of said head portion, releasable means for fixing the position of rotary adjustment of said shaft member, a calibrated index scale carried by one of said trunnion members in concentric relation to the axis of said transverse shaft, an index pointer carried by said shaft member and overlying said last-mentioned index scale, a hand wheel at one end of said transverse shaft, a threaded stud at its opposite end, one of said trunnion members having an opening engaged by said threaded stem and a nut-receiving pocket at the outer side of said trunnion member, a nut non-rotatably engaged in said pocket and having said threaded stud screwed therein, said other trunnion member having an opening of larger diameter than said transverse shaft, and a pressure ring disposed within said opening between said hand wheel and a side surface of said head portion of said shaft member whereby turning of said shaft in one direction causes said pressure ring to be pressed against said head portion and turning of said shaft in the opposite direction causes said pressure ring to be released relatively to said head portion.

2. A layout fixture comprising a base having a first planar support-engaging surface, a hub carried by said base having its axis in spaced parallel relation to said first support-engaging surface, a shaft member supported by said base including a spindle portion rotatably engaged in said hub, a head portion projecting forwardly from said hub having a pair of parallel side surfaces equally spaced at each side of the axis of said shaft member and having a transverse bearing hole having its axis normal to and intersecting the axis of said shaft member, and a stub shaft portion at the opposite end of said shaft member from said head portion and projecting from said hub, an index dial carried upon said stub shaft portion and including a circumferential calibrated index scale, an index pointer carried by said base and overlying said scale, a work-supporting table, a pair of trunnion members carried by said work-supporting table and respectively disposed at opposite sides of said head portion, a transverse shaft carried by said trunnion members and engaged in said bearing hole of said head portion, releasable means for fixing the position of rotary adjustment of said shaft member, a calibrated index scale carried by one of said trunnion members in concentric relation to the axis of said transverse shaft, an index pointer carried by said shaft member and overlying said last-mentioned index scale, means for fixing the position of rotary adjustment of said trunnion members and said table relatively to said head portion of said shaft member, said base having a second support-engaging planar surface at right angles to said first support-engaging surface and normal to the axis of said hub.

3. The invention as defined in claim 2, further characterized in that said base has third and fourth support-engaging planar surfaces at right angles to said first and second support-engaging surfaces and in spaced relation to each other at opposite sides of said hub.

4. The invention as defined in claim 3, further characterized by a well portion carried by said base open at its upper side and having at least a part of said dial member disposed therein, said well portion being defined by a forward wall, a base wall providing at its outer side said first support-engaging surface, a rear wall providing at its outer side said second support-engaging surface, and side walls providing at their outer sides said third and fourth support-engaging surfaces.

5. The invention as defined in claim 4, further characterized in that said base wall and said hub extend forwardly from said forward wall of said well portion, and a reinforcing web extending between said forwardly extending base wall, said forward wall, and said hub, and having a forward surface concentric to the axis of said transverse shaft and so spaced therefrom as to provide clearance for the rotary movement of said trunnion members and table.

6. The invention as defined in claim 4, further characterized in that said rear wall has a semi-circular opening exposing the part of said dial member disposed in said well portion.

7. A layout fixture comprising a base having a support-engaging surface, a hub carried by said base having its axis in spaced parallel relation to said support-engaging surface, a shaft member supported by said base including a spindle portion rotatably engaged in said hub, a head portion projecting forwardly from said hub having a pair of parallel side surfaces equally spaced at each side of the axis of said shaft member and having a transverse bearing hole having its axis normal to and intersecting the axis of said shaft member, and a stub shaft portion at the opposite end of said shaft member from said head portion and projecting from said hub, an index dial carried upon said stub shaft portion and including a circumferential calibrated index scale, an index pointer carried by said base and overlying said scale, a work-supporting table, a pair of trunnion members carried by said work-supporting table and respectively disposed at opposite sides of said head portion, a transverse shaft carried by said trunnion members and engaged in said bearing hole of said head portion, releasable means for fixing the position of adjustment of said shaft member, a calibrated index scale carried by one of said trunnion members in concentric relation to the axis of said transverse shaft, an index pointer carried by said shaft member and overlying said last-mentioned index scale, means for fixing the position of rotary adjustment of said trunnion members and said table relatively to said head portion of said shaft member, a work-holder comprising a frame member for disposition in a plane parallel to said work-supporting table, a plurality of equally spaced circumferentially arranged vertical sleeve portions carried by said frame member, a vertical post engaged for vertical adjustment in each of said sleeve portions, said work-supporting table having means positioned in registry with said posts for securing said posts to said table, and a plurality of clamp brackets carried by said frame member for angular adjustment about vertical axes to clampingly engage a work piece disposed within said frame member.

8. In combination with a work-supporting table of a layout fixture, a work-holder comprising a frame member for disposition in a plane parallel to said work-supporting table, a plurality of equally spaced circumferentially arranged vertical sleeve portions carried by said frame member, a vertical post engaged for vertical adjustment in each of said sleeve portions, said work-supporting table having means positioned in registry with said posts for securing said posts to said table, and a plurality of clamp brackets carried by said frame member for angular adjustment about vertical axes to clampingly engage a work piece disposed within said frame member.

9. The invention as defined in claim 8, further characterized by a stem portion at each end of each of said posts, said table having holes arranged to individually receive said stem portions.

10. The invention as defined in claim 8, further characterized in that said frame member comprises a plurality of equal length straight sides connected by angular corners and forming a polygon.

11. The invention as defined in claim 8, further characterized in that the said frame member comprises an even number of equal length straight sides connected by angular corners and forming a polygon, said sleeve portions being carried by said frame member at the alternate corners connecting said straight sides.

12. The invention as defined in claim 8, further characterized in that said frame has a rib and spaced threaded holes extending through said rib, and said clamp bracket comprises a bar having a hole adjacent one end for registry with a threaded hole of said frame, a plurality of groove means radial to said holes for receiving said rib in a selected position of angular adjustment of said bar, a cap screw engaged through said hole of said bar and screwed into said threaded hole of said frame to secure said bar, and adjustatble work-engaging clamp means carried by said bar.

13. The invention as defined in claim 12, further characterized in that said work-engaging clamp means comprises a block member mounted on said bar for angular adjustment about a vertical axis, and a horizontally adjustable clamping member carried by said block member.

References Cited

UNITED STATES PATENTS

| | | | |
|---|---|---|---|
| 111,311 | 1/1871 | Brainard | 33—174 |
| 825,329 | 7/1906 | Lemp | 287—100 X |
| 1,237,001 | 8/1917 | Webber | 33—174 |
| 1,322,302 | 11/1919 | Knab | 33—170 |
| 2,343,637 | 3/1944 | Bochenek | 33—174 |
| 2,476,361 | 7/1949 | Elliott et al. | 33—174 |
| 2,611,969 | 9/1952 | Hrcek | 33—174 |

SAMUEL S. MATTHEWS, *Primary Examiner.*